(12) United States Patent
White, III et al.

(10) Patent No.: US 11,232,515 B1
(45) Date of Patent: Jan. 25, 2022

(54) SYSTEM AND METHOD FOR IMPLEMENTING A CUSTOMER ACCOUNT AUTOMATION FRAMEWORK

(71) Applicant: JPMorgan Chase Bank, N.A., NY, NY (US)

(72) Inventors: James P. White, III, New York, NY (US); Eric Han Kai Chang, NY, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 453 days.

(21) Appl. No.: 15/461,940

(22) Filed: Mar. 17, 2017

(51) Int. Cl.
*G06Q 40/00* (2012.01)
*G06Q 40/02* (2012.01)
*G10L 15/22* (2006.01)

(52) U.S. Cl.
CPC .............. *G06Q 40/02* (2013.01); *G10L 15/22* (2013.01); *G10L 2015/223* (2013.01)

(58) Field of Classification Search
USPC ...... 705/39, 40, 45, 37, 38, 26.1, 26.4, 26.7; 719/328, 315; 717/108; 709/226, 227; 715/704, 753; 726/9, 6; 235/375, 380
See application file for complete search history.

(56) References Cited

U.S. PATENT DOCUMENTS

| | | | | |
|---|---|---|---|---|
| 8,370,265 B2 * | 2/2013 | Coulter | ............... | G06Q 20/108 705/67 |
| 8,554,653 B2 * | 10/2013 | Falkenborg | ........ | G06Q 30/0255 705/35 |
| 2004/0225509 A1 * | 11/2004 | Andre | ............... | G06Q 30/0631 705/26.7 |
| 2006/0097036 A1 * | 5/2006 | Koenigsman | .......... | G06Q 40/02 235/379 |

(Continued)

OTHER PUBLICATIONS

Using policy-based concepts to provide service oriented accounting management; NOMS 2002. IEEE/IFIP Network Operations and Management Symposium. 'Management Solutions for the New Communications World'(Cat. No. 02CH37327) (pp. 313-326); I. Radisic; Jan. 1, 2002 (Year: 2002).*

(Continued)

*Primary Examiner* — Tien C Nguyen
(74) *Attorney, Agent, or Firm* — Hunton Andrews Kurth LLP

(57) ABSTRACT

The invention relates to a method and system that implements a customer account automation framework. A mobile device or system comprises: a memory that accesses customer profile data, customer transaction data and payment rules data; and a computer processor, coupled to the memory, programmed to: identify one or more rules, each rule comprising an event and an action, wherein the one or more rules comprise one of: notification, confirmation and automation and an associated device; receive one or more (Continued)

rule suggestions automatically generated based on customer behavior and transaction data; receive one or more sponsored rule suggestions automatically generated based on sponsor data; accept at least one suggested rule, wherein the suggested rule comprises a corresponding event and a corresponding action; detect an occurrence of the event; and automatically perform the action.

10 Claims, 9 Drawing Sheets

(56) References Cited

U.S. PATENT DOCUMENTS

| | | | |
|---|---|---|---|
| 2010/0274627 A1* | 10/2010 | Carlson | G06Q 20/3224 705/51 |
| 2010/0280882 A1* | 11/2010 | Faith | G06Q 20/4016 705/7.37 |
| 2010/0312657 A1* | 12/2010 | Coulter | G06Q 20/40 705/16 |
| 2011/0313900 A1* | 12/2011 | Falkenborg | G06Q 30/0202 705/30 |
| 2012/0022945 A1* | 1/2012 | Falkenborg | G06Q 30/0255 705/14.53 |
| 2012/0072997 A1* | 3/2012 | Carlson | G06Q 30/0254 726/28 |

OTHER PUBLICATIONS

Credit users segmentation for improved customer relationship management in banking; 2011 6th IEEE International Symposium on Applied Computational Intelligence and Informatics (SACI) (pp. 379-384); Bosnjak, Z.; Grljevic, O; May 1, 2011 (Year: 2011).*

* cited by examiner

SYSTEM AND METHOD FOR IMPLEMENTING A CUSTOMER ACCOUNT AUTOMATION FRAMEWORK

FIELD OF THE INVENTION

The invention relates generally to a system and method for implementing a customer account automation framework, and more particularly to a system and method that integrates customer specific rules to automate account actions.

BACKGROUND OF THE INVENTION

Making payments, transfers, sending notifications, or any other account actions typically requires the customer to take several steps to complete. While mobile devices have made it possible to perform these actions while on the go, the steps required are largely the same (e.g., authenticate, choose account, choose action, provide detail, etc.). Currently, customers are unable to define instructions and/or macros to automate and execute frequently used actions as based on predefined events and/or prompts.

These and other drawbacks currently exist.

SUMMARY OF THE INVENTION

According to one embodiment, the invention relates to a computer implemented system that implements a customer account automation framework. A mobile device or system that processes transactions comprises: a memory that accesses customer profile data, customer transaction data and payment rules data; and a computer processor, coupled to the memory, programmed to: identify one or more rules, each rule comprising an event and an action, wherein the one or more rules comprise one of: notification, confirmation and automation and an associated device; receive one or more rule suggestions automatically generated based on customer behavior and transaction data; receive one or more sponsored rule suggestions automatically generated based on sponsor data; accept at least one suggested rule, wherein the suggested rule comprises a corresponding event and a corresponding action; detect an occurrence of the event; and automatically perform the action.

The system may include a specially programmed computer system comprising one or more computer processors, mobile devices, electronic storage devices, and networks.

The invention also relates to computer implemented method that implements customer account automation rules. The method of implementing customer account automation rules comprising the steps of: identifying one or more rules, each rule comprising an event and an action, wherein the one or more rules comprise one of: notification, confirmation and automation and an associated device; receiving one or more rule suggestions automatically generated based on customer behavior and transaction data; receiving one or more sponsored rule suggestions automatically generated based on sponsor data; accepting at least one suggested rule, wherein the suggested rule comprises a corresponding event and a corresponding action; detecting an occurrence of the event; and automatically performing the action.

The computer implemented system, method and medium described herein provide unique advantages to banking customers, according to various embodiments of the invention. The innovative system and method implements a customer account automation framework that integrates customer specific rules to automate account actions. The system applies intelligence and complex processing to suggest customized rules for customer implemented. The system also generates sponsored suggestions for enhanced revenue and partner integration. As customers may manage multiple mobile and smart devices, the features of an embodiment of the present invention address the issue of customers activating and implemented intelligent actions based on customer behavior, preferences and goals. The novel system enables a customer to implemented event and action pairs to enhance overall customer experience and realize financial goals. Other advantages include customer loyalty and retention due to the increased satisfaction of the account holder. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
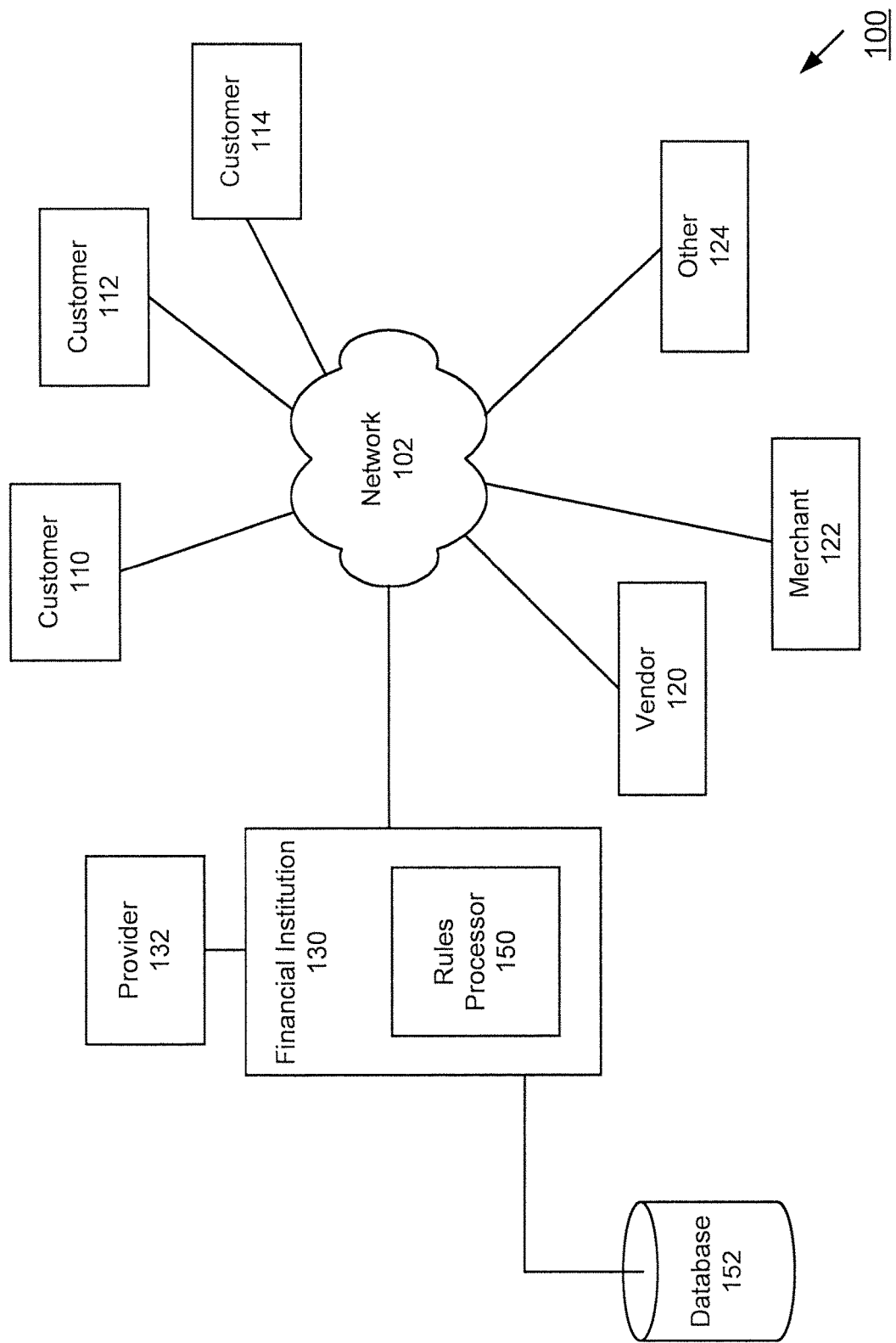
FIG. 1 illustrates a schematic diagram of a system that implements customer account automation, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to providing a customer with an interface to define various account rules. The customer may access the interface on a mobile, computer and/or other device. According to an embodiment of the present invention, the rules may include an event and an action combination. For example, the event may represent something observable from a mobile device, Internet of Things ("IoT") device or other device, as well as by data, including transaction data. An action may represent a step or a sequence of steps to be taken when the event is observed. A rules engine of an embodiment of the present invention may be integrated with existing products and/or services to allow customers to automate various actions, including account actions. Products may include smart devices, IoT devices, personal assistant devices, etc. For example, an embodiment of the present invention may be integrated with various smart home devices that receive voice command and/or other input. For example, an event may involve receiving a voice command input from a smart home device (e.g., personal assistant device, etc.).

A user may identify an event as a user command, such as a verbal command that includes a key phrase or term. In response to the key phrase or term, a corresponding device may perform a defined action or actions. For example, when [I say "Pay my brother $10" to my mobile device] then [find my contact named "brother" and use the payment app to pay him $10]. According to another example, when [I tell my smart speaker to "pay my bills"] then [initiate payment of credit card bills using main account]. According to yet another example, when [you see that it is my sister's birthday] then [lookup her contact information and send her $50 as a gift].

A user may also identify an action as an activity or other occurrence or event. In response to an observable action or activity, a corresponding device may perform a defined action, such as an account action. For example, when [my smart watch sees that I ran a 5K] then [transfer $5 from a specified account to another account].

A user may identify activity in an account, such as a deposit over a certain amount. In response to the activity, the user may request a corresponding account activity, such as a transfer, withdrawal and/or other action. For example, when [I get a deposit larger than $1000] then [transfer 10% to my vacation savings]. When [my points balance is above 12K] then [cash it all in for Amazon gift cards].

A user may also define fraud and security related actions. In this example, a user may define a potentially suspicious occurrence and request a corresponding notification or confirmation. For example, when [there is an ATM withdraw farther than 25 miles from home] then [send me a notification].

An embodiment of the present invention may provide suggested events and actions based on user activity and behavior from various sources. For example, the system may identify events and actions that are helpful to the customer based on usage and occurrence. If a customer is a victim of recent fraud, the system may provide suggestions that are specifically directed to address the recent type of fraud as well as other types of fraud.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

FIG. 1 illustrates a schematic diagram of a system that implements customer account automation, according to an exemplary embodiment. As illustrated, network 102 may be communicatively coupled with one or more data devices including, for example, computing devices associated with customers 110, 112, 114. Such devices may include mobile devices, including mobile phones, smart devices, etc. Network 102 may communicate with various vendors 120, merchants 122 as well as other providers, represented by 124. In addition, Network 102 communicates with Financial Institution 130 that provides credit and debit transaction processing. Financial Institution 130 may include a Rules Processor 150 that facilitates processing of customer automated rules for various customers. Customer profile data, account data, transaction data and historical data may be stored and managed by Database 152. Also, Database 152 may also store customer automated rules, e.g., event and action details, customer usage of rules, rules activity, etc. The customer automated rules features described herein may be provided by Financial Institution 130 and/or a third party provider, represented by 132, where Provider 132 may operate with Financial Institution 130 or other entity. Rules Processor 150 may generate and apply customer automated rules, according to an exemplary embodiment of the present invention.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Customer 110, 112, 114 may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Financial Institution 130.

Financial Institution 130 may be communicatively coupled to Database 152. For example, Database 152 may store customer account data, prior transactions, payment rules, profile data, etc. Database 152 may include any suitable data structure to maintain the information and allow access and retrieval of the information. For example, Database 152 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Database 152 may be any suitable storage device or devices. The storage may be local, remote, or a combination thereof with respect to Database 152. Database 152 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Database 152 may have back-up capability built-in. Communications with Database 152 may be over a network, such as network 102, or communications may involve a direct connection between Database 152 and Financial Institution 130, as depicted in FIG. 1. Database 152 may also represent cloud or other network based storage.

Having described an example of the hardware, software, and data that can be used to run the system, an example of the method and customer experience will now be described. The method will be described primarily as an example in which a customer downloads a software application (sometimes referred to as an "app") and uses it to perform banking transactions and/or other functionality, including making purchases. However, those skilled in the art will appreciate that the principles of the invention can be applied to related circumstances, such as where the entity providing the app is a business other than a financial institution, or where the financial institution app functionality is provided through a browser on the customer's mobile device rather than through a software application (app) downloaded to the customer's mobile device, and with purchases from various providers.

Figure 2:
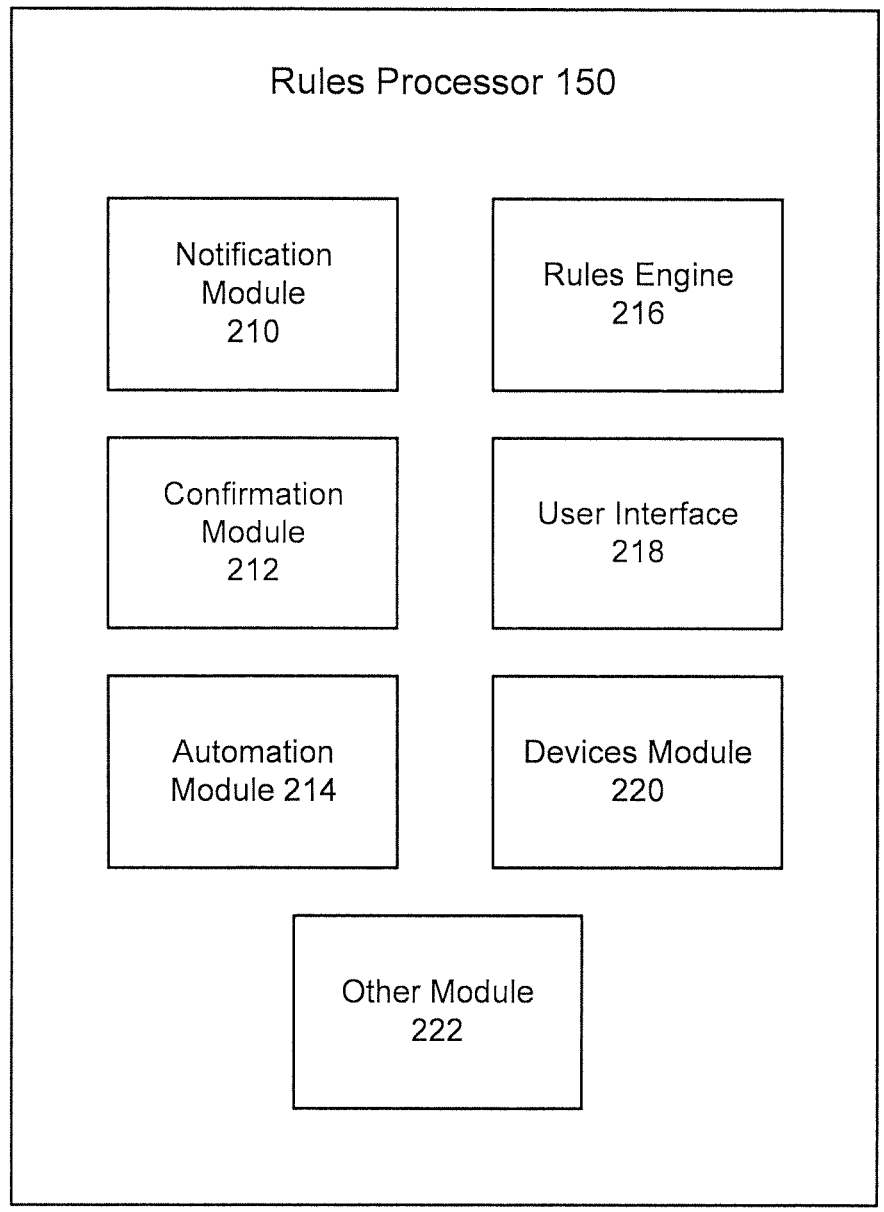
FIG. 2 is an exemplary diagram of a processor for customer account automation, according to an embodiment of the present invention.

FIG. 2 is an exemplary Rules Processor, according to an embodiment of the present invention. Rules Processor 150 may include various modules and interfaces, including Notification Module 210, Confirmation Module 212, Automation Module 214, Rules Engine 216, User Interface 218, Devices Module 220 and Other Module 222. These modules are exemplary and illustrative, the Rules Processor may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Notification Module 210 provides a passive type of notification for an event. For example, a user may request notification of certain account activity, e.g., clearing of a check, etc.

Confirmation Module 212 involves customer approval before initiating a corresponding action. For example, a customer may require confirmation of card activity outside a geographic area. Such activity may indicate a high risk of potential fraud.

Automation Module 214 enables a user to define an event and a corresponding action. The corresponding action may include multiple steps and even multiple independent actions. Automation rules may include making payments, transferring funds to an account, etc.

Rules Engine 216 manages a customer's account automation rules, which may include active rules, dormant rules (e.g., rules on pause, etc.), sponsored rules, suggestions rules, etc. Rules Engine 216 may also track rule activity and provide analytics and metrics for better tailored suggested rules.

Rules Engine 216 may define an event, action and a corresponding or related device. For example, the event may involve a mobile device (e.g., mobile phone, etc.), wearables (e.g., smart watch, etc.), IoT device, smart devices, etc. The event may also be based on transaction data, account data, and/or other type of data. Actions may include a single act as well as multiple steps that are contingent or independent of each other.

User Interface 218 may be accessible via a mobile device, desktop device and other computing device, processor or system.

Devices Module 220 may maintain and manage associated devices, which may include mobile devices, processors, IoT devices, passive devices, smart devices, wearables, etc. Devices may represent any device or source of data. For example, devices may detect a voice command, text command, GPS location, proximity to a merchant or other location, contacts, calendar, etc.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 3:
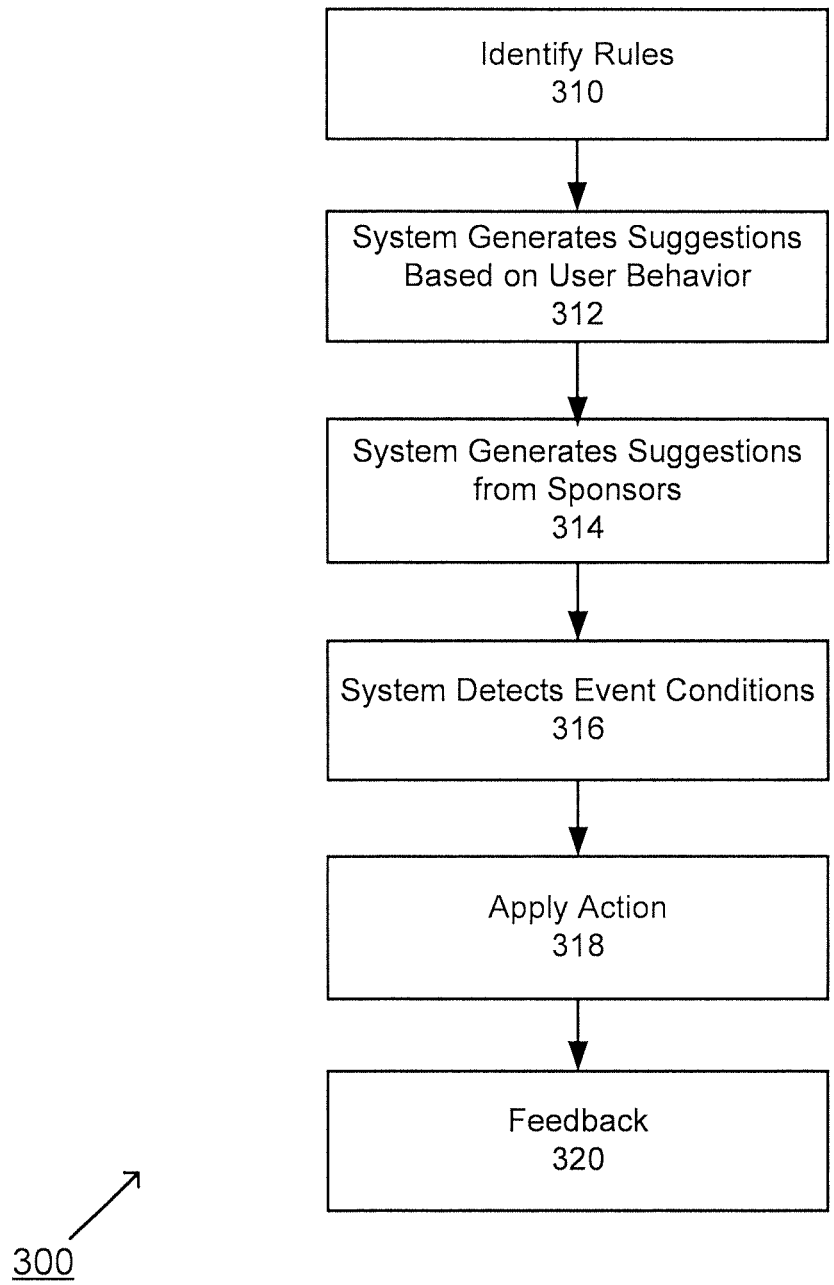
FIG. 3 is an exemplary flowchart for implementing customer account automation, according to an embodiment of the present invention.

FIG. 3 is an exemplary flowchart for implementing customer account automation, according to an embodiment of the present invention. At step 310, a customer may identify one or more rules. At step 312, suggestions may be provided based on user behavior and/or other information. At step 314, suggestions may be provided from sponsors. At step 316, the system may detect customer defined event conditions. At step 318, the system may apply a corresponding action. At step 320, a system may apply a feedback procedure to continuously learn from user behavior and other inputs. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, a customer may identify one or more rules. The customer may define rules as well as accept suggested rules.

Figure 4:
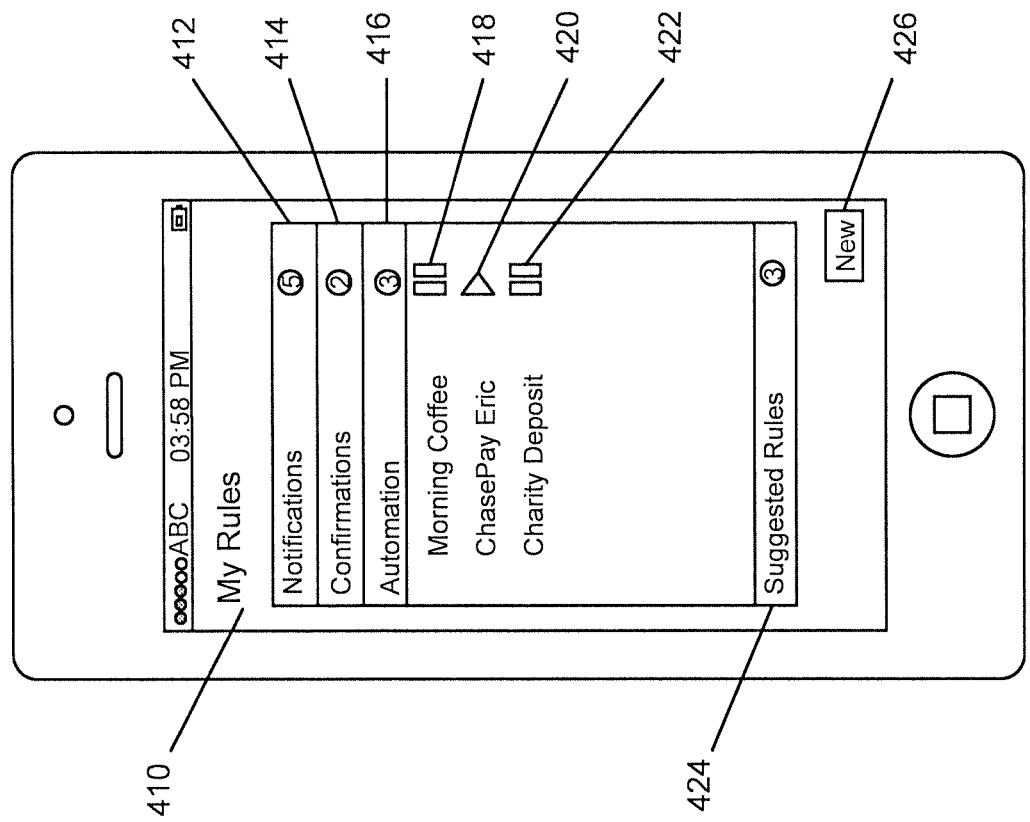
FIG. 4 is an exemplary illustration of a rules interface, according to an embodiment of the present invention.

FIG. 4 is an exemplary illustration of a rules interface, according to an embodiment of the present invention. As shown in FIG. 4, a customer may view account automation rules, at 410. A customer may manage various types of rules, including Notifications 412, Confirmations 414, Automation 416 and Suggestions 424. In this example, a user has five notification rules, two confirmation rules, three automation rules, and three suggested rules. As shown in FIG. 4, the customer's automation rules include Morning Coffee 418, Pay Eric 420 and Charity Deposit 422. The customer has put Morning Coffee and Charity Deposit on hold or pause, while Pay Eric 420 is currently active. Once a rule is define, a customer turn the rule on, off and/or place the rule on pause. Rule status may also be automatically updated by the system. For example, a rule may be turned off for a predetermined time period while the customer is on vacation. In this case, the customer may activate fraud rules to protect the customer while the customer is away from home. Such fraud rules may include notifying the customer when a transaction is made outside a geographic area. Also, the rule may be automatically activated when a predetermined condition is observed.

A user may also identify a new rule at 426. Other inputs and commands may be implemented.

Figure 5:
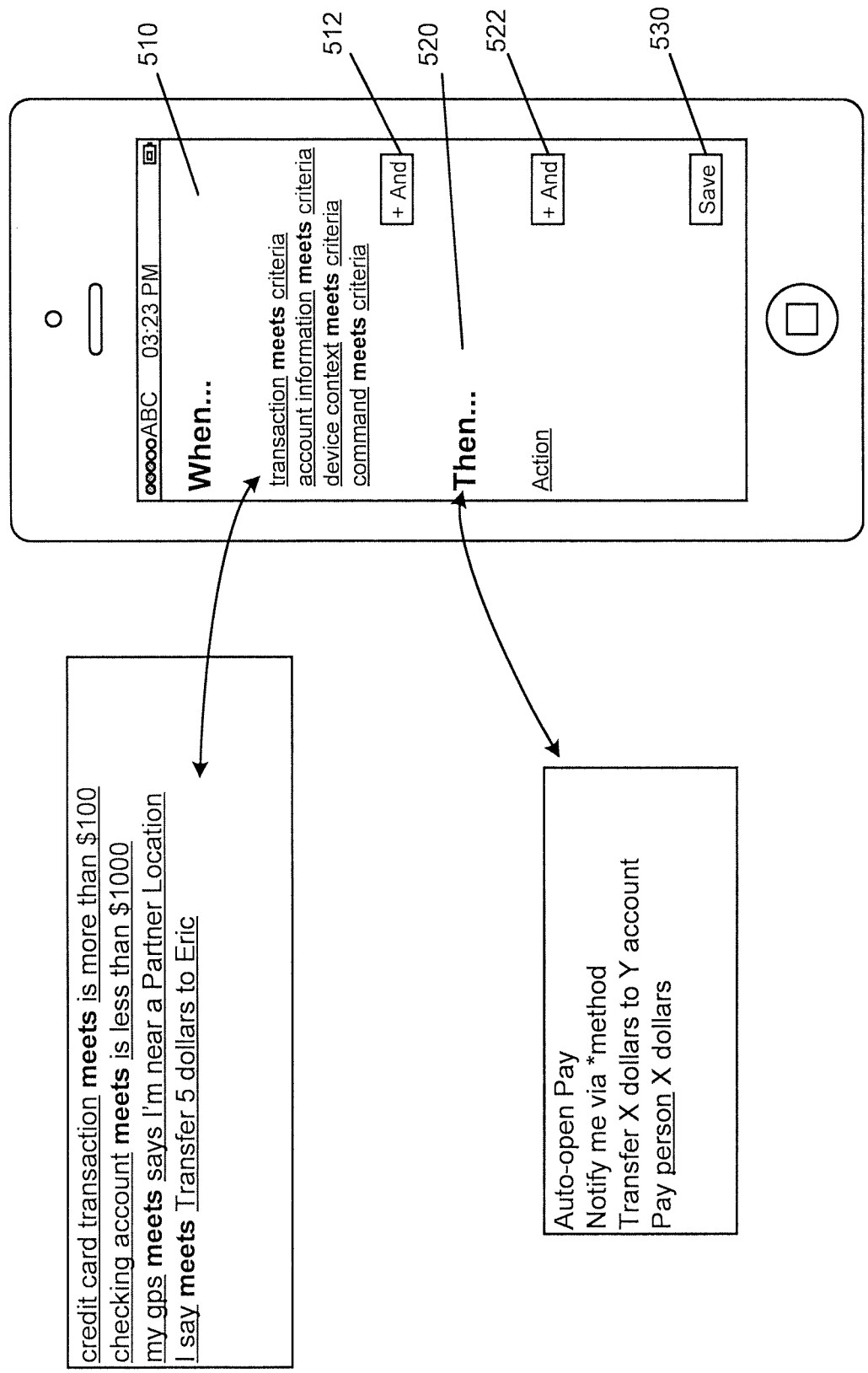
FIG. 5 is an exemplary illustration of a customer account automation rule, according to an embodiment of the present invention.

FIG. 5 is an exemplary illustration of a customer account automation rule, according to an embodiment of the present invention. FIG. 5 illustrates components of a customer automation rule. A customer may define an event at 510 and an action at 520. The customer may also add additional conditions at 512 to an event as well as additional conditions 522 to an action.

Figure 6:
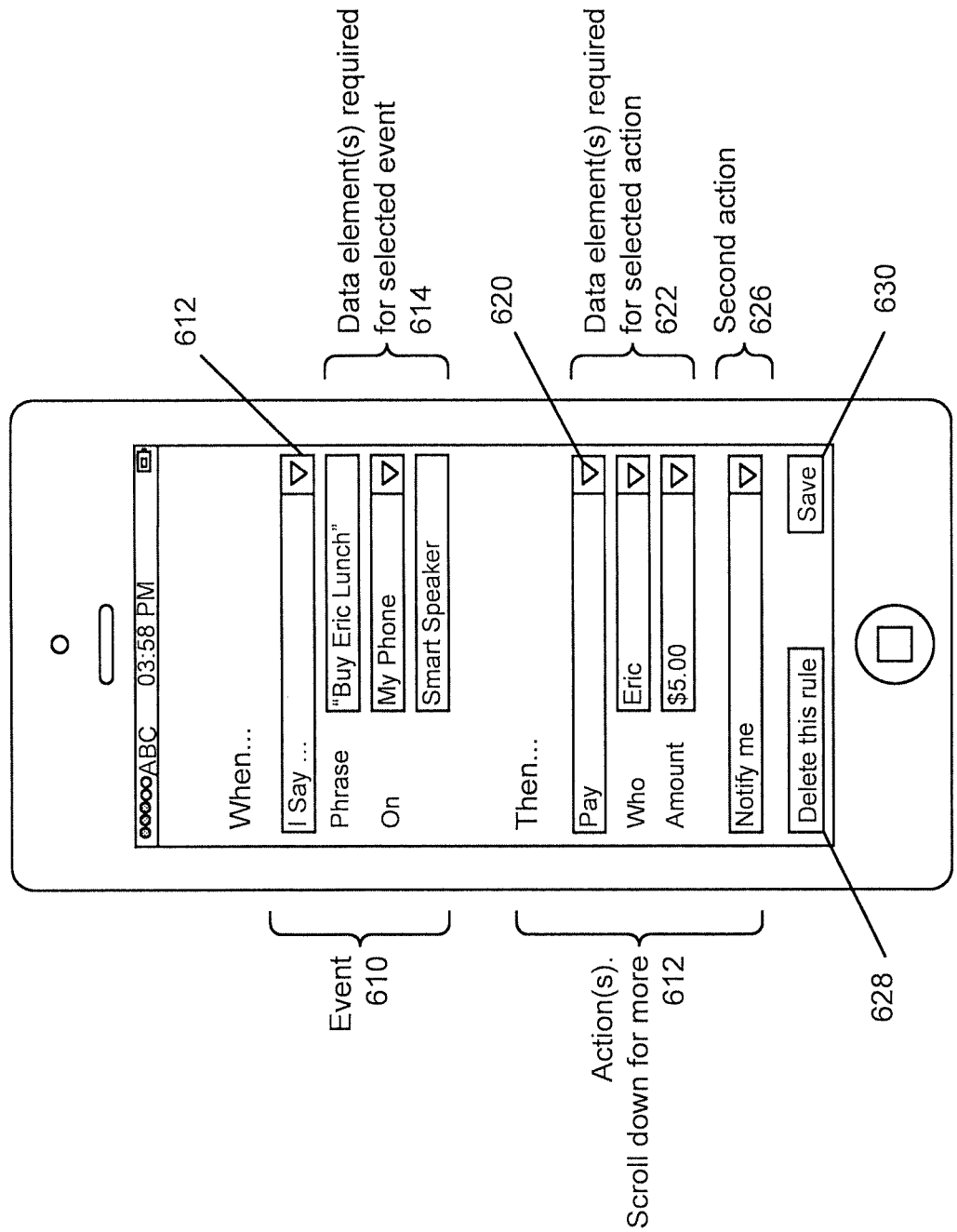
FIG. 6 is an exemplary illustration of an event and an action, according to an embodiment of the present invention.

FIG. 6 is an exemplary illustration of an event and an action, according to an embodiment of the present invention. As shown in FIG. 6, a customer may define an Event 610. In this example, the customer may identify a phrase or a term as a verbal command, at 612. The customer may then identify data elements for a corresponding action at 614. The action may include a receiving or associated device. The customer may also define one or more actions that correspond or relate to the event. The action may be defined at 612. In this example, the customer may identify data elements at 622. This may include an account action to a recipient for a specified amount. The amount may be predetermined, variable, or other. The customer may also identify multiple actions, at 626.

The customer may perform other actions, such as Delete Rule 628 and Save Rule 630.

At step 312, suggestions may be provided based on user behavior and/or other information. At step 314, suggestions may be provided from sponsors.

Figure 7:
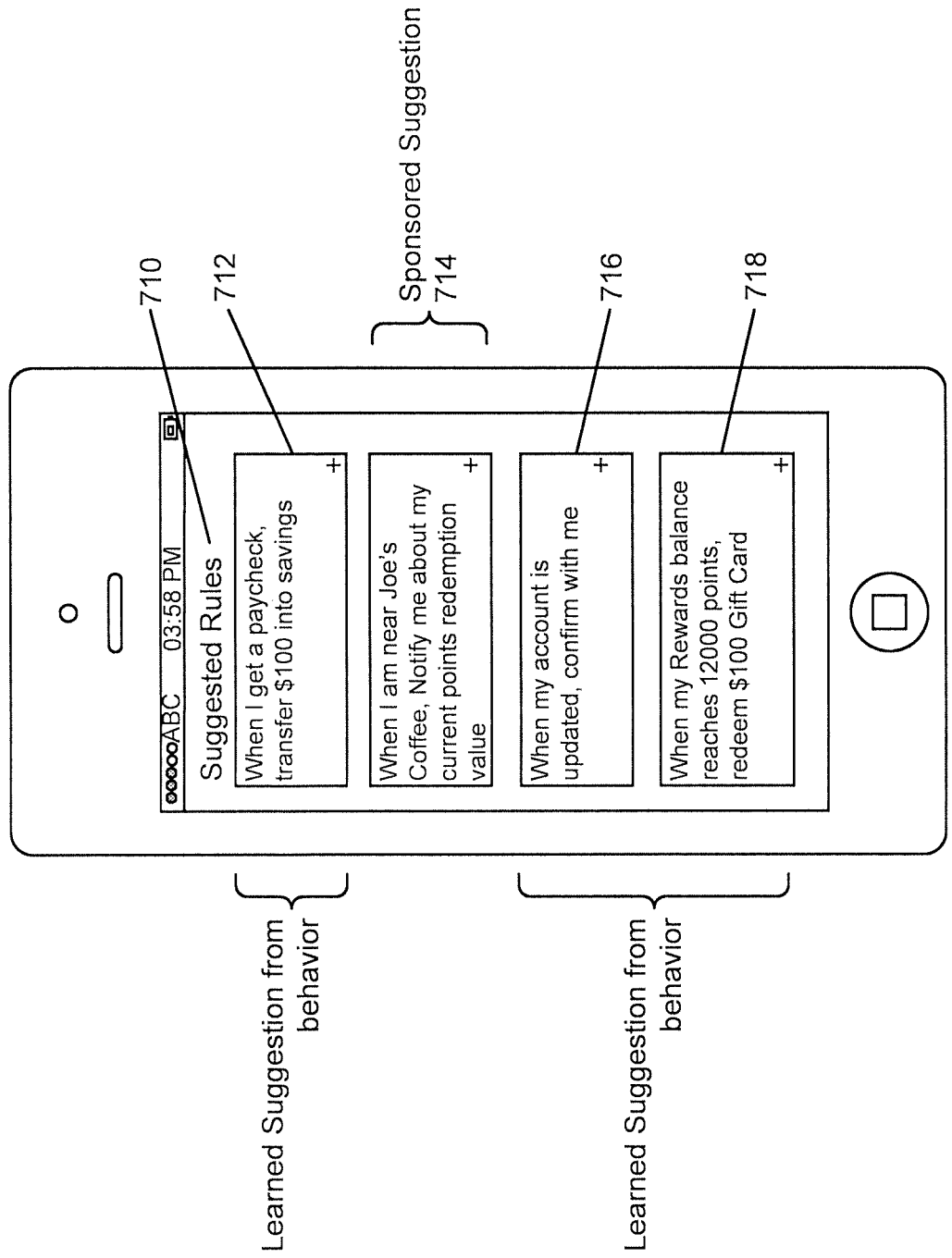
FIG. 7 is an exemplary illustration of a suggested rule, according to an embodiment of the present invention.

FIG. 7 is an exemplary illustration of a suggested rule, according to an embodiment of the present invention. As shown in FIG. 7, the system of an embodiment of the present invention may analyze customer behavior, rule usage, and/or other analytics to determine potentially useful rules. For example, a customer may be a recent victim of fraud. Because of this fraudulent activity, the system may suggest rules that can help the customer to better safeguard the account. The system may recognize that the customer is saving up for a family vacation. In this scenario, the system may provide suggested rules to encourage better saving behavior. Other life events and goals may be recognized by the system through direct input, customer behavior, recent customer purchases and transactions as well as customer trends. Other data, indirectly relevant to the customer, may be analyzed as well. Example suggestions are illustrated at 712, 716 and 718.

In addition, the system may analyze transaction history and develop and suggest a rule based on customer activity. For example, a customer may transfer a $100 into a savings account when the customer receives a paycheck. The suggested rule 712 may be provided to the customer. Upon viewing the suggestion, the customer may decide to modify the amount to $125, $75, etc. Accordingly, the system of an embodiment of the present invention may provide suggestions based on customer transaction history, customer behavior, customer goals, and/or other input where the customer may refine and/or revise the suggested rules.

The system may also partner with sponsors, including merchants, vendors, service providers, third party entities, government entities, charitable organizations, non-profits and/or other entities to provide customized suggestion rules. For example, the system may recognize that the customer has a coffee app downloaded on the customer's phone. The system may also recognize that the customer has a customer automation rule that is specific to a local coffee shop. The system may suggest a rule that is related to the customer's interest in coffee and tied to a specific merchant to encourage sales and marketing opportunities.

According to another example, the system may recognize when a customer is within close proximity to a customer's preferred coffee shop. The customer may be informed of current promotions, deals, current point value and/or other opportunities. As the customer is within close proximity, the system may confirm a coffee order (based on prior historical data or other input) with the customer. Upon approval, the system may place the coffee order as the customer is approaching the coffee shop.

According to yet another example, the system may inform the customer of certain opportunities. For example, a customer may receive a notification that a merchant (a few steps away) allows customers to spend points instead of dollars. In this example, as a customer approaches a mobile phone store, the customer may receive a notification that the customer has $100 worth of redeemable points that are accepted at the mobile phone store. The system may further highlight merchants and opportunities that correspond to a customer's browsing history and/or includes items that are in a customer's shopping cart or wish list.

The system may also inform the customer of charitable opportunities that are aligned with a customer's interest and giving history.

The system may also encourage the customer to save to an account and/or reach other financial and other goals. For example, as the customer interacts with merchants and/or other providers, the customer may be encouraged to save a percentage or an amount to a savings or other account (e.g., vacation account, toy fund, etc.). The system may also reward the customer based on activity. For example, when a customer finishes a race, the customer may be automatically rewarded by a predetermined action (e.g., purchase something on the customer's wish list, transfer funds to a vacation account, etc.)

The system of an embodiment of the present invention may also provide suggestions for products and/or services that are better suited to the customer. For example, a service provider may suggest a new product or service that is an enhancement over a product or service that the customer is currently using. According to this example, the system may suggest a credit card product that could actually earn the customer more points and benefits based on the customer's purchases. The system may also provide an illustration (e.g., graphic, comparison chart, animation, etc.) that shows a comparison between a current product and a new product as well as potential benefits of upgrading or switching to the new suggested product. A customer may be informed that based on the last 30 days of activity, the customer would have earned 25% more points if the customer used a new suggested product.

According to another embodiment of the present invention, the customer may receive additional inputs as defined in U.S. provisional application 62/454,376, filed Feb. 3, 2017, the contents of which are incorporated herein by reference in its entirety.

At step 316, the system may detect customer defined event conditions. At step 318, the system may apply a corresponding action.

Figure 8:
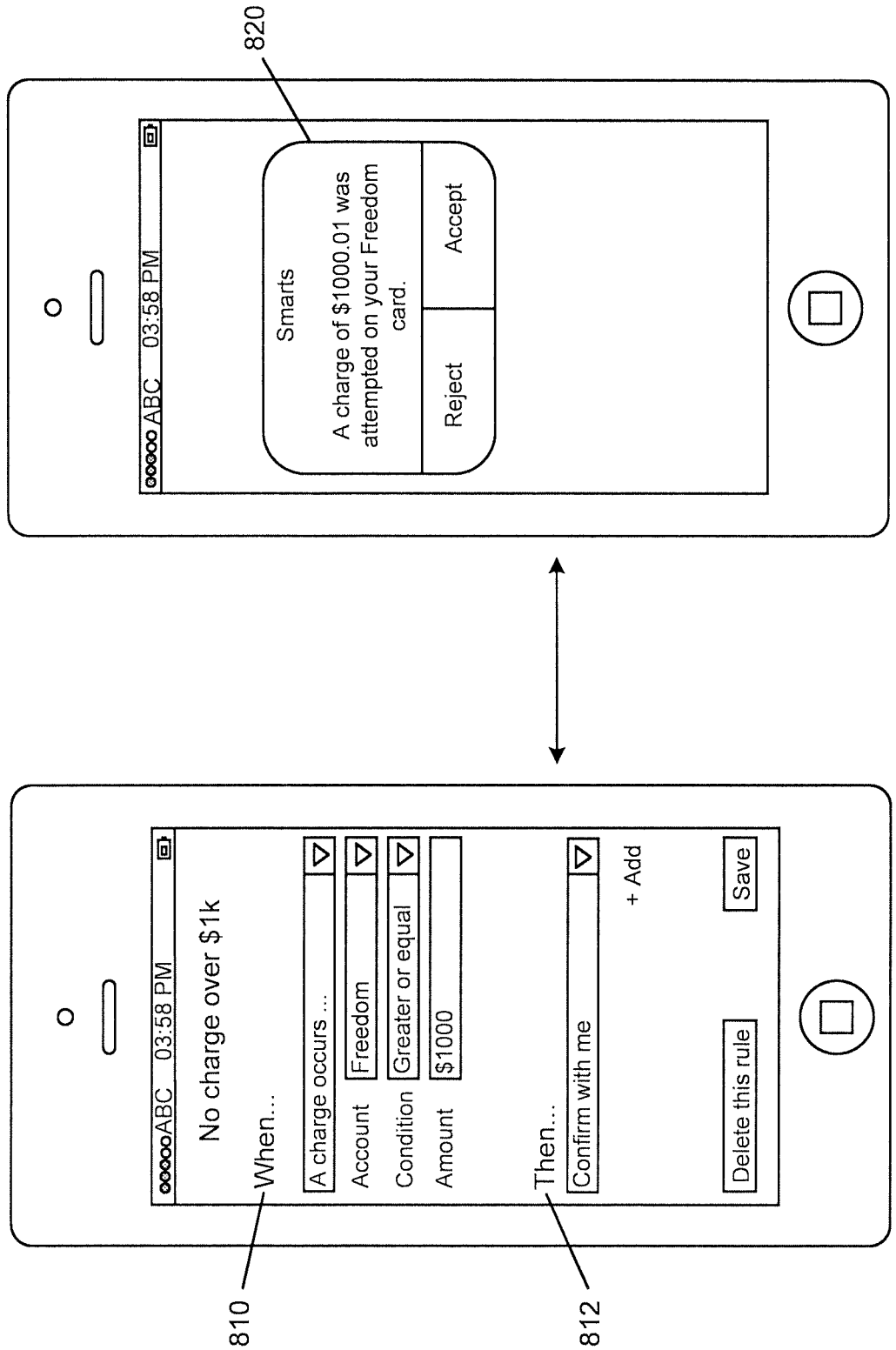
FIG. 8 is an exemplary illustration of a customer account automation rule, according to an embodiment of the present invention.

FIG. 8 is an exemplary illustration of a customer account automation rule, according to an embodiment of the present invention. As shown in FIG. 8, a customer may define a rule with an event and an action. The event in this example is when a charge on a specific account is over a predetermined amount. The action involves a confirmation. When the event is detected by the system, the customer may receive a confirmation message as shown at 820. The customer may further define the type of notification (e.g., text, email, voicemail, emoji, icon, etc.) on one or more devices (e.g., customer's mobile phone, spouse's mobile phone, parent's mobile phone, etc.). Because the rule is a confirmation, the customer is required to accept or reject the charge before the charge is processed.

Figure 9:
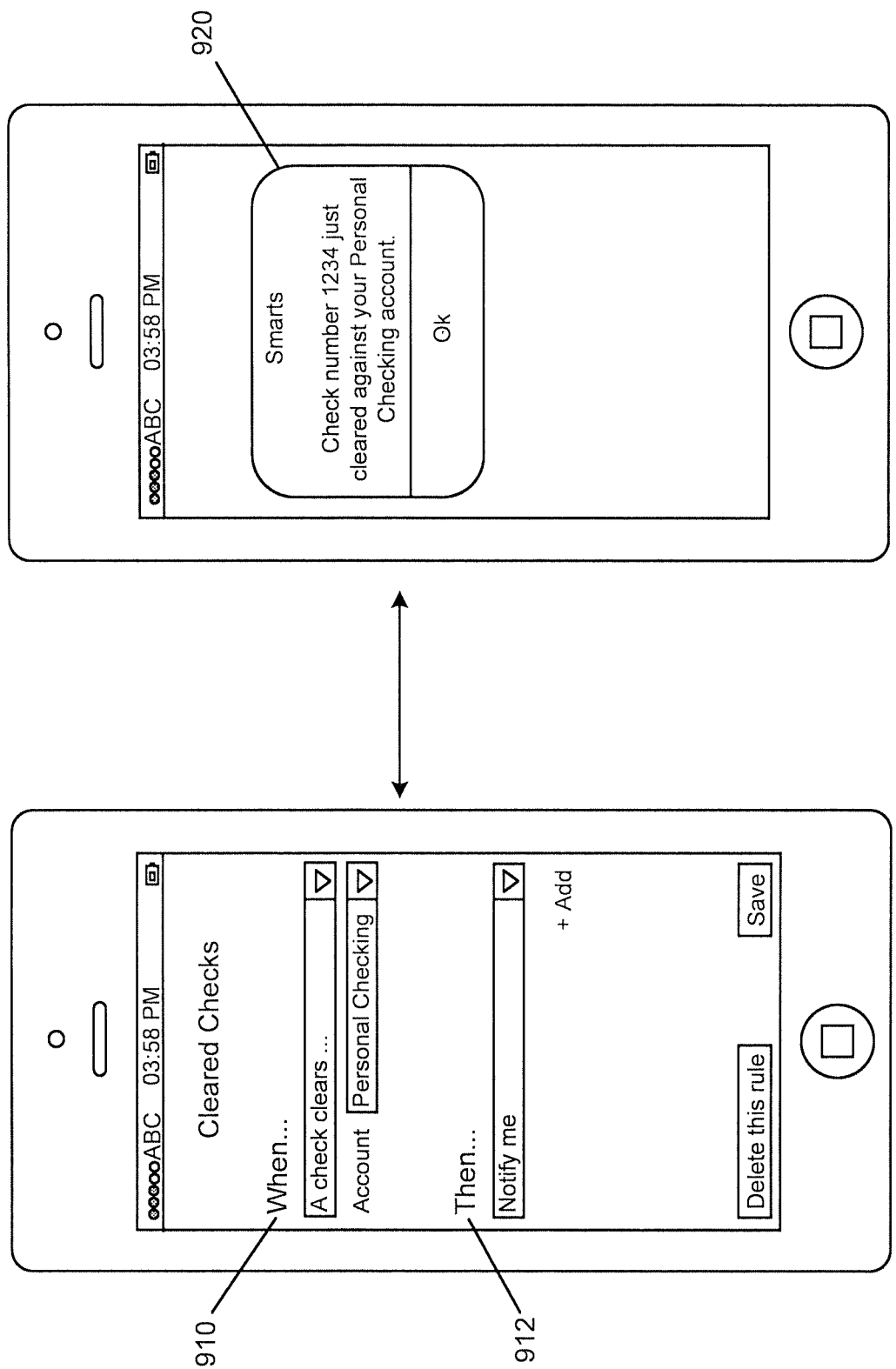
FIG. 9 is an exemplary illustration of a customer account automation rule, according to an embodiment of the present invention.

FIG. 9 is an exemplary illustration of a customer account automation rule, according to an embodiment of the present invention. As shown in FIG. 9, a customer may define another rule with an event and an action. In this example, the event is when a check clears with a specific account. The action involves a notification. When the event is detected by the system, the customer may receive a notification as shown at 920. The customer may further define the type of notification (e.g., text, email, voicemail, emoji, icon, etc.) on one or more devices (e.g., customer's mobile phone, spouse's mobile phone, parent's mobile phone, etc.). Because the rule is a notification, the customer may be asked to simply acknowledge the notification.

According to another example, a customer location may be detected by the customer's mobile device as well as other devices, such as a customer's watch or other wearable as well as a customer's automobile.

At step 320, a system may apply a feedback procedure to continuous learn from user behavior and other inputs.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for optimizing rule-based automation of routine electronic tasks, the method comprising:

constructing, by a rules engine, a plurality of user-defined rules from user-provided information, entered directly via a rules identification screen of a user interface with user-selected menu options for specifying one or more input events and one or more output actions for each of the plurality of user-defined rules, wherein the user interface is associated with an application running on a mobile device of a user;

generating, one or more suggested rules that are based on one or more learned user preferences, as determined from rule usage activity and a transaction history associated with the user, and tied to one or more specific merchant services within a pre-defined proximity to the user, wherein a rule confirmation message is automatically generated on the user interface when the user is within the pre-defined proximity to a specific merchant matching one or more learned user preferences, enabling the user to activate the rule as the user is approaching the specific merchant; and displaying, through the rules interface, a plurality of account automation rules grouped under various rule type designations comprising notifications, confirmations, automations and suggested rules, with a rule count displayed for each rule type designation, wherein the notifications, confirmations and automations rule types correspond to the plurality of user-defined rules with each user-defined rule represented by a descriptive rule name and a rule status corresponding to visually distinct indications for an active and a dormant state.

2. The method of claim 1, wherein one or more user-defined rules listed under the notifications rule type designation provide one or more passive notifications in response to an occurrence of the one or more input events associated with the one or more user-defined rules.

3. The method of claim 1, wherein one or more user-defined rules listed under the confirmation rule type designation require an approval from the user prior to initiating the one or more output actions associated with the one or more user-defined rules.

4. The method of claim 1, wherein the one or more output actions comprises multiple steps performed in a predetermined sequence.

5. The method of claim 1, wherein the occurrence of the one or more input events is detected by an Internet of Things device.

6. The method of claim 1, wherein the occurrence of the one or more input events is detected by the mobile device associated with the user.

7. The method of claim 1, wherein the occurrence of at least one of the one or more input events is detected by a global positioning technology of the mobile device associated with the user.

8. The method of claim 1, wherein the occurrence of at least one of the one or more input events is detected by a speech recognition component of the mobile device associated with the user.

9. The method of claim 1, wherein at least one of the one or more output actions involves a financial account of the user.

10. The method of claim 1, wherein the one or more suggested rules are continuously updated by a feedback procedure based on analytics of rule usage and transaction history associated with the user.

* * * * *